United States Patent [19]
Parsons et al.

[11] 3,900,328
[45] Aug. 19, 1975

[54] METHOD AND APPARATUS FOR MOLDING GLASS LENSES

[75] Inventors: William F. Parsons; Gerald E. Blair; Clarence C. Maier, all of Rochester, N.Y.

[73] Assignee: Eastman Kodak Company, Rochester, N.Y.

[22] Filed: Mar. 12, 1973

[21] Appl. No.: 340,510

Related U.S. Application Data

[63] Continuation of Ser. No. 93,336, Nov. 27, 1970, abandoned.

[52] U.S. Cl. ............... 106/39.5; 65/32; 65/374; 65/68; 65/72; 65/76; 65/77
[51] Int. Cl. ................. A44c ; C03b 9/14
[58] Field of Search ....... 65/32, 374, 25 A, 39, 223, 65/77, 68, 72, 76; 161/7, 2

[56] References Cited
UNITED STATES PATENTS

| | | | |
|---|---|---|---|
| 1,229,324 | 6/1917 | Rosenblum | 65/32 |
| 2,395,727 | 2/1946 | Devol | 65/182 A |
| 2,478,090 | 8/1949 | Devol | 65/25 A |
| 3,103,428 | 9/1963 | Stello et al. | 65/32 X |
| 3,140,164 | 7/1964 | Long | 65/32 X |
| 3,152,384 | 10/1964 | Todaig et al. | 65/32 X |
| 3,306,723 | 2/1967 | Forber | 65/223 X |
| 3,372,017 | 3/1968 | Pitbladbo | 65/182 |
| 3,416,907 | 12/1968 | Carnall, Jr. et al. | 65/32 |
| 3,451,794 | 6/1969 | Patterson | 65/32 X |
| 3,457,054 | 7/1969 | Pei | 65/32 X |
| 3,534,803 | 10/1970 | Bickerdike | 65/374 X |
| 3,589,880 | 6/1971 | Claric | 65/32 X |
| 3,725,023 | 4/1973 | Parris | 65/32 |

*Primary Examiner*—Frank W. Miga
*Attorney, Agent, or Firm*—R. F. Brothers

[57] ABSTRACT

A method for producing finished, image forming glass lenses wherein heat-softened optical glass is placed in the cavity of a mold made of glasslike carbon and subjected to heat and pressure. The walls defining the mold cavity have a high surface quality and accuracy, and the cavity is configured to produce lenses of predetermined shapes.

31 Claims, 2 Drawing Figures

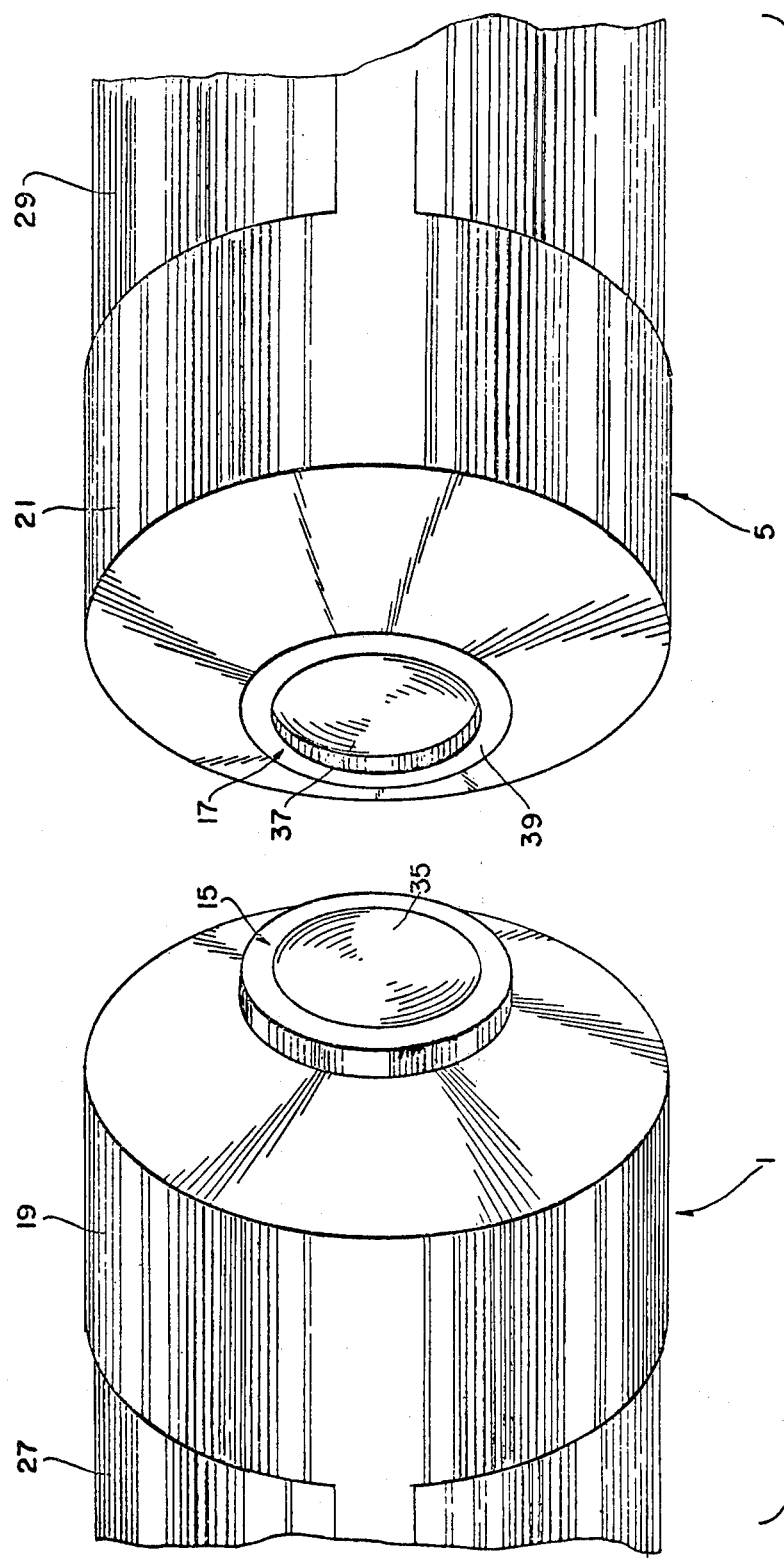

METHOD AND APPARATUS FOR MOLDING GLASS LENSES

CROSS REFERENCE TO RELATED APPLICATION

This is a continuation of U.S. application Ser. No. 93,336, filed Nov. 27, 1970 now abandoned.

Reference is made to commonly assigned copending U.S. application Ser. No. 340,139 filed Mar. 12, 1973 now U.S. Pat. No. 3,833,347 issued on Sept. 3, 1974 in the names of Gerald E. Blair, Clarence C. Maier and Milton A. Angle, which application is a continuation of U.S. application Ser. No. 93,351, filed Nov. 27, 1970 now abandoned and to commonly assigned copending U.S. application Ser. No. 307,254 filed on Nov. 16, 1972 in the names of M. A. Angle, G. L. Bender, G. E. Blair and C. C. Maier.

BACKGROUND OF THE INVENTION

1. Field of the Invention

This invention relates to the manufacture of glass lenses, and in particular to the molding of glass into finished lens elements.

2. Description of the Prior Art

The manufacture of optical lens elements has long involved resort to painstaking procedures which are complex, slow, and expensive. Despite diligent efforts within the lens making industry to improve existing methods of lens manufacture, the conventional methods require many separate operations. According to one such method, a rough molded glass blank is first made by heating a weighed chunk of glass to a plastic state and pressing the glass to the desired shape in a metal mold. The blank is necessarily larger than the intended finished lens element to allow for the removal of material, since the outer layers of the lens blank are often of low quality. The lens is preliminarily shaped by a grinding wheel having an abrasive surface with diamond chips. Spherical lens surfaces are generated by rotating the blank in a vacuum chuck and grinding the blank with a rotating annular wheel whose axis is at an angle to the chuck axis. The geometry of this arrangement causes a sphere to be generated wherein the radius is determined by the angle between the axes of the chuck and of the rotating generating tool, and by the effective diameter of the tool. The thickness is governed by the distance the work is advanced into the tool. The production of non-spherical lens surfaces involves a different, more complicated process, which will be described below.

It is customary to process optical elements in multiples by fastening or "blocking" a suitable number of lens blanks on a common support. The reasons for this are to reduce costs, and because better surface results are achieved when the processing is averaged over a larger area represented by a number of pieces. The blanks are fastened to the blocking tool with a pitch which adheres to the blanks. Usually, pitch buttons are molded to the back of the warmed lens blanks and then stuck to the heated blocking tool. The surface of the lens blank is refined by a series of grinding operations performed with loose abrasive in a water slurry and cast iron grinding tools. If the elements have not been generated, they are initially ground with a coarse, fast-cutting emery. Otherwise, grinding commences with a medium grade and proceeds to a very fine grade which imparts a smooth, velvety surface to the glass. Each successively finer grade of emery is used until the grinding pits left by the preceding grade are ground out.

After the grinding operation has been concluded, the lens element is polished by a process similar to the grinding process. The polishing tool is lined with a layer of pitch and the polishing compound is a slurry of water and rouge (iron-oxide) or cerium oxide. Polishing is continued until all of the grinding pits and scratches are removed from the surface of the lens. Then, the lens shape is checked and corrections are made to assure the proper shaping of the lens.

Following the polishing operation, the lens is centered by grinding the rim of the lens, so that its mechanical axis (defined by the edge of the lens) coincides with the optical axis (the line between the centers of curvature of the two lens surfaces). Lens centering can be done either by a known visual method which is very accurate or by a more economical mechanical method.

As indicated above, it is considerably more complicated to produce non-spherical lens surfaces. The manufacture of precise aspheric lens surfaces requires a combination of exacting measurement and skilled hand correction. One method involves the difficult operation of working a lens blank between centers on a lathe. Aspheric lenses can be made in small production quantities, where high precision is not required, by means of a cam guided grinding rig for generating the lens surface. Thereafter, the troublesome operations of grinding and polishing the aspheric lens surface are performed, the problem being that these operations can easily destroy the basic shape of the lens. Where precise aspheric surfaces are required, it is necessary to make grinding adjustments manually with the concomitant requirements of great delicacy and finesse, the shortcomings of which are apparent.

The expense of existing methods for fabricating glass lenses has led to the limited use of plastic lenses. Plastic has several advantages as a lens material, namely it is light, shatterproof and moldable. However, presently available plastics which are practical for use as lens materials, such as polystyrene, polycyclohexyl methacrylate, and polymethyl methacrylate, are relatively soft and scratch easily. Moreover, the latter plastic tends to be frequently hazy and sometimes yellowish. Also, plastics usually soften within the range of 60° to 80° C and their indices of refraction may change in time. Most plastics absorb water and are subject to change dimensionally, the latter characteristic being due to their tendency to cold flow under pressure and to their high thermal expansion coefficient which is almost ten times that of glass. In addition, the high thermal expansion of the plastics causes changes in the indices of refraction of the plastics to an extent ten times that of glass, thus severely hampering the optical performance of the lens.

Thus, glass is clearly a more desirable lens material than plastic, but plastic lenses are considerably easier and cheaper to manufacture than glass lenses because they can be mass produced by molding. However, existing molding methods have not been suitable for the molding of finished glass lenses because of the physical characteristics of glass and its tendency to adhere to some materials. U.S. Pat. No. 2,410,616 teaches a machine for molding glass lenses which have an accurate "spectacle finish" on their surfaces, such a finish being defined as one resembling and closely approaching the finish of spectacles, and which therefore always require finishing by grinding and polishing operations. Optical glass has been found to accurately replicate the surfaces of those mold materials to which it does not adhere, and this tendency has heretofore made all of the latter known mold materials unacceptable for the molding of glass lenses. For example, glass molded in metal dies dhas been found to reproduce the grain structure of the mold material on the surface of the glass, and therefore such lenses have been found to be unsuitable for use in photographic apparatus. Thus, the failure of known molding apparatus and processes to produce acceptable glass lenses has necessitated reliance on the time consuming and expensive lens production methods described above.

SUMMARY OF THE INVENTION

Accordingly, an object of the present invention is to manufacture optical elements in an economic manner.

An object of the present invention is to manufacture glass lenses in an economical manner.

Another object is to manufacture image forming glass lenses with surfaces having high quality and high accuracy.

A still further object is to provide an improved method and apparatus for molding glass into optical elements.

A more specific object is to provide an improved method and apparatus for molding glass into lenses.

A further object is to provide an improved method and apparatus for molding glass into lenses suitable for use in photographic apparatus.

An additional object of the invention is to provide a mold capable of molding glass into lenses having a predetermined shape with a high surface quality and a high surface accuracy.

Another object is to provide a mold for molding glass into optical elements.

Another object is to provide optical elements which have been made in an economical manner.

Another object is to provide image-forming glass lenses having predetermined shapes and high surface accuracy and quality, which have been made in an economical manner.

Other objects will be apparent to those skilled in the art from the description to follow and from the appended claims.

The above objects are achieved according to this invention by molding glass into lenses of predetermined shapes in a mold made of glasslike carbon. The mold cavity is defined by surfaces which are of a high quality and a high accuracy comparable to that of a finished, image-forming lens. In one embodiment of the present invention, the molding process comprises the steps of placing a portion of heat-softened optical glass in such a glasslike carbon mold, closing the mold members until the glass in the mold cavity conforms to the shape of the cavity, and removing the finished lens from the mold. The mold and the glass are subjected to various temperatures and pressures in order to produce the desired glass lens.

According to a preferred embodiment of the invention, the glasslike carbon mold is preheated and subjected to an inert or slightly reducing atmosphere, a portion of heat-softened optical glass is placed in the mold cavity, the mold is closed and subjected to a prescribed pressure which is maintained for a prescribed period of time, and the mold is opened and the finished lens removed.

BRIEF DESCRIPTION OF THE DRAWINGS

In the preferred embodiments of the invention described below, reference is made to the accompanying drawings, in which:

FIG. 2 is a detailed isometric view of the mold employed in the apparatus shown in FIG. 1.

DETAILED DESCRIPTION OF THE PREFERRED EMBODIMENTS

Figure 1:
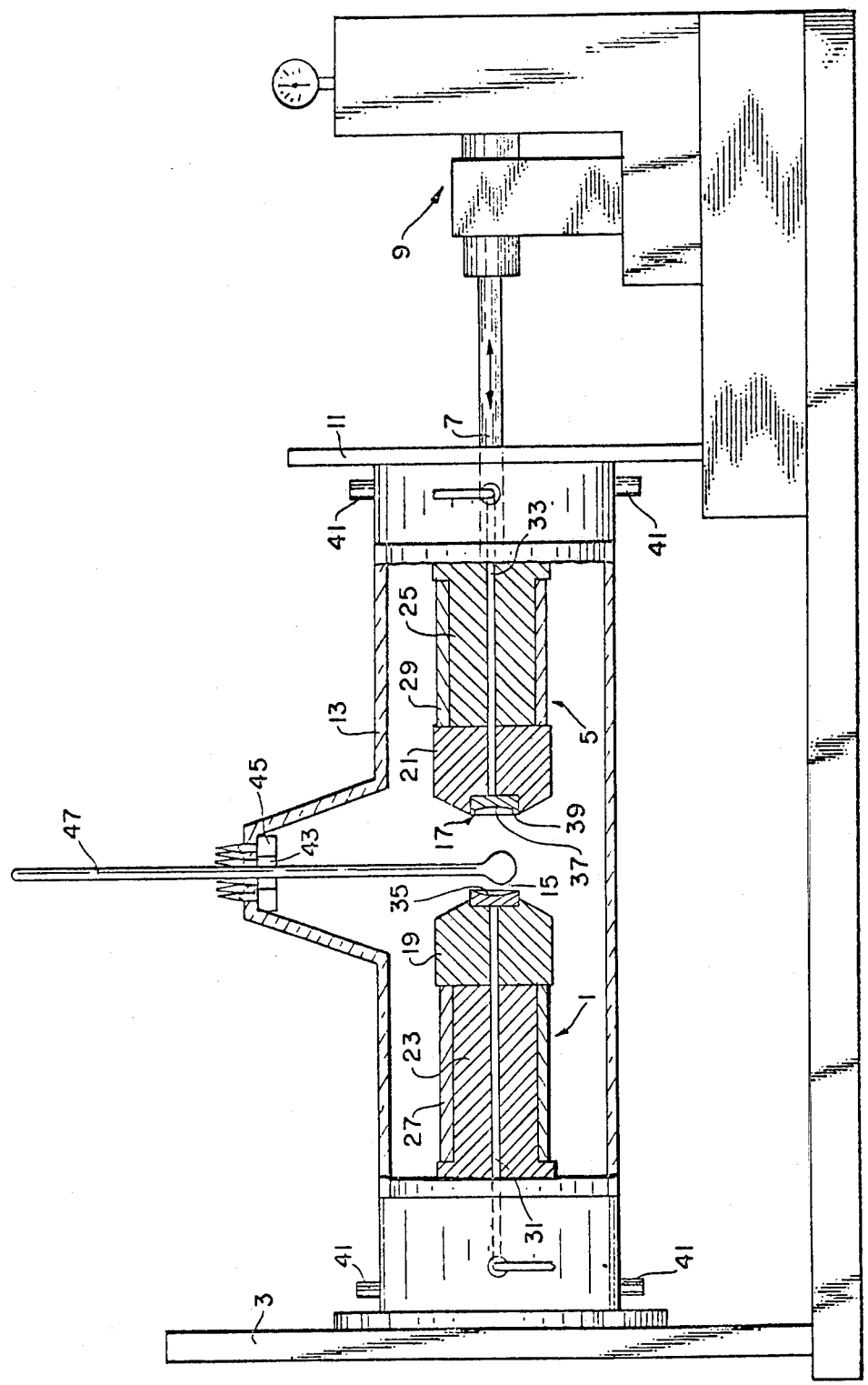
FIG. 1 is a schematic view of a molding apparatus for producing glass lenses according to the invention.

In order for a glass lens to be incorporated in a photographic apparatus or in any optical system requiring good image forming qualities, the lens must meet certain criteria. These criteria are very strict, which is the reason that the existing carefully controlled lens fabricating processes are used. Some of these criteria relate to the nature of the glass itself and are not of interest here. What is of interest here is the nature of the surface of the lens. The lens surface is selected by the lens designer for a particular purpose, and not only must the parameters defining the lens shape be carefully conformed to, but the lens surface itself must be carefully controlled. The major characteristics of an optical surface are known in the art as surface quality and surface accuracy. Surface quality refers to the finish of the lens and includes such defects as scratches, digs, pits, "orange peel," and the like. Surface accuracy, which is usually specificed in terms of the wave length of light of a specific color, refers to the dimensional characteristics of the surface, i.e. the value and uniformity of the radius of curvature of the surface. The surface accuracy is generally determined by an interferometric comparison of the lens surface with a test plate gage, by counting the number of Newton's rings, and examining the regularity of the rings. The surface accuracy of a lens is often referred to as its fit. The fit of a lens is expressed in terms of its power (the number of Newton's rings which are counted) and its irregularity (the difference between the number of rings when counted in perpendicular directions across the fringe pattern). The lower the power and irregularity, the better the lens. The quality of the surface of a lens which is to be used in an optical system of the type used in photographic apparatus or equivalent apparatus must be high, and the term "high surface quality" is used herein to refer to a finished lens for such use. A lens having a high surface quality would therefore not normally require any subsequent grinding or finishing operations. Similarly, a lens having high surface accuracy or a "precise fit" is one which has dimensional characteristics which are extremely close to their design value and are very uniform. The surface accuracy of a lens used in many applications in photographic apparatus is considered high when it has a power of less than 6 rings and an irregularity of less than three rings.

As stated previously, a factor severely impairing the development of a process for molding finished glass lenses is the tendency of molten or softened optical glass to either adhere to certain materials or to accurately replicate the surface structure of mold materials. We have found that lenses having high surface quality and accuracy can be molded in molds made from glasslike carbon which is chemically inert, which has no grain boundaries, and to which molten glass does not permanently adhere. These glasslike carbon materials were initially developed for use as sheathing in nuclear reactors and have since found many applications in the electronics and metallurgy fields. We have discovered a new use for these materials in the optical field. These materials can be polished to a glassy finish to which softened or molten glass will not permanently adhere. This new group of carbons has been given the generic term "glasslike" because they exhibit a glassy surface appearance, conchoidal fracture, internal-friction characteristics resembling glass more closely than normal graphite, and gas impermeability comparable to that of glass. Examples of such a meterial are known under a variety of names such as the following: glassy carbon, vitreous carbon, LMSC glassy carbon, Carbone Vitreux, vitro carbon and cellulose carbon. Glasslike carbon is prepared by the thermal degradation of organic polymers, and has a crystal structure with a maximum crystal size which is often about 20 A. Glasslike carbon is extremely chemically inert and it is isotropic. Further description of the chemical and physical properties of glasslike carbon as well as specific methods for preparing such a material are disclosed in U.S. Pat. Nos. 3,446,593 and 3,109,712 and in Shigehiko Yamada, *A Review of Glasslike Carbons*, Defense Ceramic Information Center (DCIC) Report 68-2, Battelle Mem. Inst., 1968. Since there are no detectable crystal lattices or grain boundaries, it is possible to give the material the highly polished, specular surface referred to above. The replication of such a surface by glass has been found to leave the glass with a high surface quality. The term glasslike carbon is used herein to describe a meterial which, while it may exhibit all of the characteristics described in this paragraph, exhibits at least the following characteristics: prepared by the thermal degradation of an organic polymer, substantially chemically inert with heated glass and isotropic.

The present invention provides a practicable method and apparatus for molding finished glass lenses. The molding process requires a glasslike carbon mold having a mold cavity which is configured to yield a finished lens of a predetermined shape and which is defined by walls having a surface quality and a surface accuracy comparable to that of the finished lens. The mold can comprise, for example, a pair of separable mold members having opposing walls which cooperatively define a mold cavity when the mold members are in their closed positions. The walls defining the cavity are shaped much like the predetermined shape of the lens to be produced by the mold, but provisions may have to be made for dimensional changes occuring in the molded glass lens resulting from temperature changes and the like during and after the molding process.

Since heat softened or molten glass replicates surfaces with which it becomes in int'mate contact, the surfaces of the cavity-defining walls must be rendered extremely smooth and dimensionally accurate. This can be accomplished by grinding and polishing these walls until they reach the tolerance limits established for the intended lens. As indicated previously, the surface accuracy of lenses of the quality used in photographic apparatus should frequently be with 6 Newton rings of power. Surface accuracy to well within this degree has been achieved in the walls defining the cavities of glasslike carbon molds. Likewise, these same mold walls must have a high surface quality to the degree mentioned previously, which renders them substantially devoid of scratches, digs, pits, and the like. The glasslike carbon molds are preferably installed as inserts on sturdy support members in order to add strength and durability to the molds.

The process of molding the glass lenses basically comprises placing a portion of heat-softened glass in the cavity of the glasslike carbon mold, applying appropriate amounts of heat and pressure to the mold while maintaining a non-oxidizing atmosphere in the mold vicinity, cooling and opening the mold, and removing the finished lens.

A molding apparatus with which the present invention can be practiced is shown in FIG. 1. The apparatus comprises a stationary mold assembly 1 fixed relative to a support member 3, and an opposed movable mold assembly 5. Mold assembly 5 is movable in a reciprocating manner by a ram or plunger 7 which is driven by a conventional pneumatic press 9 or other similar device. Plunger 7 is movable through an appropriate opening in a support member 11. The two mold assemblies are contained in a glass envelope 13 which defines a molding chamber in which the atmospheric conditions can be controlled.

Mold assemblies 1 and 5 include (taken from the molding area outwardly) glasslike carbon mold inserts 15 and 17, graphite cores 19 and 21 for supporting the inserts in an opposed relationship, supports 23 and 25 which can be composed of graphite, sets of ceramic encased heaters 27 and 29 for supplying (by conduction) the heat required for the molding operation, and thermocouple assemblies 31 and 33 which are thermally connected with the mold inserts for controlling the molding temperatures.

Referring to FIG. 2, the opposing surfaces 35 and 37 of glasslike carbon mold inserts 15 and 17 are contoured according to the shape of the lens to be produced. These surfaces cooperate to form the opposite surfaces of the lens. They are finished, such as by grinding and polishing, to have a high surface accuracy and quality comparable to that of the intended lens. A ringlike element 39 is disposed around at least one of the surfaces for adding the necessary thickness to the lens to be produced. The mold thus comprises three members, and the mold surfaces are fabricated from glasslike carbon.

In order to effectively practice the disclosed embodiment of the invention, it is necessary to maintain an oxygen free atmosphere within the molding chamber. Therefore, a set of four input ports 41 for forming gas to be admitted to the chamber are provided. An entrance 43 is provided in envelope 13 for admitting glass stock to the molding area as described below, and a gas jet 45 surrounds entrance 43 for releasing oxygen-starved gas which is ignited to form a flame curtain to prevent the passage of oxygen into the chamber. In order to mold glass lenses with the apparatus described above, the end of a glass cane 47 is heated sufficiently to soften the glass, and the softened end is inserted through entrance 43 and positioned between the opposing molding surfaces of the glasslike carbon inserts.

A preferred method of molding the glass lenses involves the steps of preheating the glasslike carbon mold members, heatsoftening a portion of glass (such as the end of a glass cane as explained above), placing the softened glass in the mold, compressing the mold until the glass conforms to the shape of the mold cavity, and opening the mold and removing the finished lens. More specifically, one example of a method of producing finished glass lenses in apparatus of the type shown in FIG. 1 involves the steps of:

adjusting the power to heaters 27 and 29 to preheat the opposite mold inserts 15 and 17 to raise the temperature of the mold to within the temperature range of 530°C–590°C (the preheating of the mold prevents thermal shock and the creation of glass deformities which would otherwise occur were there a significant temperature differential between the mold and the glass therein);

establishing a flow rate of five cubic feet per hour of a gas consisting of 95 percent nitrogen and 5 percent hydrogen into the molding chamber through ports 41 to prevent any oxidation within the chamber, and igniting gas released by jet 45;

heat softening a ¼ inch cane of optical crown glass to a temperature of 600°C–700°C, such as with a pair of opposing gas-air burners;

inserting the softened end of the cane through entrance 43 and positioning it between inserts 15 and 17;

applying a load of from 200 to 300 pounds on mold assembly 5;

maintaining the load from 2 to 20 seconds; and removing the load, taking the cane with the lens attached thereto from the mold; and cracking the finished lens from the cane.

The foregoing method was used to produce lenses having a diameter of ⅝ inches, a thickness of 2.00mm., and a radius of curvature of 10.0cm.

The apparatus shown in FIG. 1 for molding the lenses is not necessary for carrying out the present invention and other types of molding apparatus may be more suitable for different situations and conditions. The foregoing temperatures, pressures, and time periods will of course vary depending upon the nature of the lens and of the glass. As indicated earlier, the present invention has been found to produce image forming lenses having surfaces characterized by a high quality and a high accuracy. The invention is a significant breakthrough in the art of lens fabrication.

Lenses produced by the molding process have been found to be superior to ground and polished lenses in a significant respect. When lenses are ground and polished, there is a flow of glass at the surface of the lenses which results from the action of the grinding tools and from the heat generated thereby. The glass tends to flow into the minute pits which exist near the glass surface, and to trap air in the pits in the form of air pockets or bubbles. These pockets detract from the quality of the lens optical capabilities because they increase the scatter of the lens. Molding does not entrap air in the lens, and therefore molded lenses do not exhibit the light scattering disability.

The present invention has been practiced with glasslike carbons obtained from several sources, including: vitreous carbon supplied by the Beckwith carbon Corporation; Glassy Carbon 2000 supplied by the Lockhead Palo Alto Research Laboratory and carbone vitreux supplied by Le Carbone Lorraine. While use of these materials did not produce identical results, each was polished to a glassy finish to which softened or molten glass did not permanently adhere. Moreover, a mold cavity was formed in each material which was defined by walls having a surface quality and surface accuracy comparable to that of a finished optical element and configured to yield a finished element. While not all of the materials listed on page 9 have been tested in the practice of the present invention, applicants believe that all of these materials possess sufficiently similar physical and chemical properties so that each of these, as well as any other glasslike carbon materials, can be successfully utilized in the practice of the present invention.

The invention has been described in detail with particular reference to preferred embodiments thereof but it will be understood that variations and modifications can be effected within the spirit and scope of the invention.

we claim:

1. A method of molding glass which comprises pressing a heat softened glass against a molding surface of glasslike carbon, the glasslike carbon being a form of carbon which has been prepared by the thermal degradation of an organic polymer, which is substantially chemically inert with heated glass and which is isotropic.

2. A method of molding glass into a finished lens which comprises pressing a heat softened glass against a molding surface of glasslike carbon, the glasslike carbon being a form of carbon which has been prepared by the thermal degradation of an organic polymer, which is substantially chemically inert with heated glass and which is isotropic and a surface of the glasslike carbon having been finished to provide a molding surface which is specular and which has a high surface quality and a high surface accuracy.

3. A method of molding glass which comprises the steps of:

providing a molding surface of glasslike carbon that defines a mold cavity, the glasslike carbon being a form of carbon which has been prepared by the thermal degradation of an organic polymer, which is substantially chemically inert with heated glass and which is isotropic; and pressing a heat softened glass contained within the mold cavity into contact with the molding surface.

4. A method of molding glass which comprises the steps of:

providing relatively separable mold members, at least one of which includes a molding surface of glasslike carbon that defines a mold cavity, the glasslike carbon being a form of carbon which has been prepared by the thermal degradation of an organic polymer, which is substantially chemically inert with heated glass and which is isotropic; and pressing a heat softened glass contained within the mold cavity into contact with the molding surface.

5. A method of molding glass into a finished glass lens which comprises the steps of:

providing relatively separable mold members, at least one of which includes a surface of glasslike carbon, the glasslike carbon being a form of carbon which has been prepared by the thermal degradation of an organic polymer, which is substantially chemically inert with heated glass and which is isotropic and the surface of the glasslike carbon having been finished to provide a molding surface which is specular, which has a high surface quality and a high surface accuracy and which defines a mold cavity; and pressing a heat softened glass contained within the mold cavity into contact with the molding surface.

6. A method of molding glass which comprises the steps of:
   providing mold members which are relatively movable to a cooperating position and which include molding surfaces of glasslike carbon that define a mold cavity when the mold members are in their cooperating position, the glasslike carbon being a form of carbon which has been prepared by the thermal degradation of an organic polymer, which is substantially chemically inert with heated glass and which is isotropic; and
   pressing a heat softened glass contained within the mold cavity into contact with the molding surfaces.

7. A method as in claim 6 comprising also the step of introducing heat softened glass between the mold members prior to pressing the glass.

8. A method as in claim 7 comprising also the step of heating the mold members prior to introducing the heat softened glass.

9. A method as in claim 6 comprising also the step of moving the mold members away from their cooperating position to permit removal of the molded glass.

10. A method as in claim 6 comprising also the step of establishing a non-oxidizing atmosphere around the mold members.

11. A method of molding glass into a finished lens which comprises the steps of:
    providing mold members which are relatively movable to a cooperating position and which include surfaces of glasslike carbon, the glasslike carbon being a form of carbon which has been prepared by the thermal degradation of an organic polymer, which is substantially chemically inert with heated glass and which is isotropic and selected surfaces of the glasslike carbon having been finished to provide molding surfaces which are specular, which have a high surface quality and a high surface accuracy and which define a mold cavity when the mold members are in their cooperating position; and
    pressing a heat softened glass contained with the mold cavity into contact with the molding surfaces.

12. A method of molding glass comprising the steps of:
    providing mold members which are relatively movable to a cooperating position and which include molding surfaces of glasslike carbon that define a mold cavity when the mold members are in their cooperating position, the glasslike carbon being a form of carbon which has been prepared by the thermal degradation of an organic polymer, which is substantially chemically inert with heated glass and which is isotropic;
    introducing heat softened glass between the mold members; and
    urging the mold members toward their cooperating position to bring the molding surfaces into contact with the glass and to press the glass into the configuration of the mold cavity.

13. A method as in claim 12 comprising also the step of heating the mold members prior to introducing the glass.

14. A method as in claim 12 comprising also the step of moving the mold members away from their cooperating position to permit removal of the molded glass.

15. A method as in claim 12 comprising also the step of establishing a non-oxidizing atmosphere around the mold members.

16. A method of molding glass into a finished lens comprising the steps of:
    providing mold members which are relatively movable to a cooperating position and which include surfaces of glasslike carbon, the glasslike carbon being a form of carbon which has been prepared by the thermal degradation of an organic polymer, which is substantially chemically inert with heated glass and which is isotropic and selected surfaces of the glasslike carbon having been finished to provide molding surfaces which are specular, which have a high surface accuracy and a high surface quality and which define a mold cavity when the mold members are in their cooperating position;
    introducing heat softened glass between the mold members; and
    urging the mold members toward their cooperating position to bring the molding surfaces into contact with the glass and to press the glass into the configuration of the mold cavity.

17. A method of molding glass comprising:
    providing mold members which are relatively movable to a cooperating position and which include molding surfaces of glasslike carbon that define a mold cavity when the mold members are in their cooperating position, the glasslike carbon being a form of carbon which has been prepared by the thermal degradation of an organic polymer, which is substantially chemically inert with heated glass and which is isotropic;
    establishing a non-oxidizing atmosphere around the mold members;
    placing heat softened glass between the mold members and
    urging the mold members toward their cooperating position to bring the molding surfaces into contact with the heat softened glass and to press the glass into the configuration of the mold cavity.

18. A method as in claim 17 comprising also the step of heating the mold members prior to introducing the heat softened glass.

19. A method as in claim 17 comprising also the step of moving the mold members away from their cooperating position to permit removal of the molded glass.

20. A method of molding a finished glass lens comprising the steps of:
    providing mold members which are relatively movable to a cooperating position and which include surfaces of glasslike carbon, the glasslike carbon being a form of carbon which has been prepared by the thermal degradation of an organic polymer, which is substantially chemically inert with heated glass and which is isotropic and selected surfaces of the glasslike carbon having been finished to provide molding surfaces which are specular, which have a high surface quality and a high surface accuracy and which define a mold cavity when the mold members are in their cooperating position;
    establishikng a non-oxidizing atmosphere around the mold members;
    placing heat softened glass between the mold members; and
    urging the mold members toward their cooperating position to bring the molding surfaces into contact with the heat softened glass and to press the glass into the configuratiion of the mold cavity.

21. A method of molding glass comprising the steps of:

providing mold members which are relatively movable to a cooperating position and which include molding surfaces of glasslike carbon that define a mold cavity when the mold members are in their cooperating position, the glasslike carbon being a form of carbon which has been prepared by the thermal degradation of an organic polymer, which is substantially chemically inert with heated glass and which is isotropic;

establishing a non-oxidizing atmosphere around the mold members;

heating the mold members;

placing heat softened glass between the mold members;

urging the mold members toward their cooperating position to bring the molding surfaces into contact with the heat softened glass and to press the glass into the configuration of the mold cavity; and moving the mold members away from their cooperative position to permit removal of the molded glass.

22. A method of molding glass comprising the steps of:

providing mold members which are relatively movable between open and closed positions and which include molding surfaces of glasslike carbon that define a mold cavity when the mold members are in their closed positions, the glasslike carbon being a form of carbon which has been prepared by the thermal degradation of an organic polymer, which is substantially chemically inert with heated glass and which is isotropic;

heating the mold members;

establishing a non-oxidizing atmosphere around the mold members;

heat softening a portion of optical glass;

placing the heat softened glass between the mold members in their open positions;

moving the mold members toward their closed positions to bring the molding surfaces into contact with the heat softened glass and to press the glass into the configuration of the mold cavity; and moving the mold members away from their closed position to permit removal of the molded glass.

23. A method of molding glass comprising the steps of:

providing a plurality of mold members which are relatively movable between open and closed positions and which include molding surfaces of glasslike carbon that define a mold cavity when the mold members are in their closed positions, the glasslike carbon being a form of carbon which has been prepared by the thermal degradation of an organic polymer, which is substantially chemically inert with heated glass and which is isotropic;

heating the mold members;

establishing a non-oxidizing atmosphere around the mold members;

heat-softening a portion of optical glass;

placing the heat-softened glass between the mold members;

closing the mold members until the glass is contacted by the molding surfaces and further closing the mold members until the glass in the mold cavity conforms to the configuration of the mold cavity.

24. A method of molding glass into an optical element comprising the steps of:

providing mold members which are relatively movable between open and closed positions and which include molding surfaces of glasslike carbon that define a mold cavity when said mold members are in their closed position, the glasslike carbon being a form of carbon which has been prepared by the thermal degradation of an organic polymer, which is substantially chemically inert with heated glass and which is isotropic;

heating the mold members to a temperature within the range from 530°C to 590°C;

establishing an atmosphere of 95% nitrogen and 5% hydrogen around the mold members;

heat softening an optical glass at a temperature within the range from 600°C to 700°C;

placing the heat softened glass between the mold members in their open position;

moving the mold members toward their closed position to bring the molding surfaces into contact with the heat softened glass and applying a load of from 200 pounds to 300 pounds to the mold members while the molding surfaces are in contact with the glass for a period of from two seconds to twenty seconds; and moving the mold members to their open position to permit removal of the molded glass element.

25. A glass element molded in accordance with the method of claim 1.

26. A glass element molded in accordance with the method of claim 12.

27. A glass element molded in accordance with the process of claim 17.

28. A glass lens molded in accordance with the method of claim 2.

29. A glass lens molded in accordance with the method of claim 16.

30. A glass lens molded in accordance with the method of claim 20.

31. A mold for producing an optical element having a predetermined shape, a predetermined surface quality and a predetermined surface accuracy, said mold comprising a plurality of mold members which are relatively movable between open and closed positions and which include walls formed of glasslike carbon that define, when the mold meambers are in their closed positions, at least one mold cavity having a configuration for yielding an optical element having said predetermined shape, said cavity-defining walls having a specular surface and having a surface quality and a surface accuracy substantially equal to the predetermined surface quality and surface accuracy of the optical element and the glasslike carbon being a form of carbon which has been prepared by the thermal degradation of an organic polymer, which is substantially chemically inert with heated glass and which is isotropic.

* * * * *

UNITED STATES PATENT OFFICE
CERTIFICATE OF CORRECTION

PATENT NO. : 3,900,328

DATED : August 19, 1975

INVENTOR(S) : William F. Parsons   Gerald E. Blair   Clarence C. Maier

It is certified that error appears in the above-identified patent and that said Letters Patent are hereby corrected as shown below:

Column 3, line 7      change "dhas" to --has--

Column 5, line 14     change "meterial" to --material--

Column 10, line 37    before "and" insert --;--

Column 10, line 62    delete "establishikng" and substitute --establishing--

Column 12, line 39    delete "process" and substitute --method--

Column 12, line 52    change "meambers" to --members--

UNITED STATES PATENT OFFICE
CERTIFICATE OF CORRECTION

PATENT NO. : 3,900,328

DATED : August 19, 1975

INVENTOR(S) : William F. Parsons  Gerald E. Blair  Clarence C. Maier

It is certified that error appears in the above-identified patent and that said Letters Patent are hereby corrected as shown below:

Column 4, line 32    change "specificed" to --specified--

Column 9, line 42    change "with" to --within--

Signed and Sealed this tenth Day of February 1976

[SEAL]

Attest:

RUTH C. MASON
*Attesting Officer*

C. MARSHALL DANN
*Commissioner of Patents and Trademarks*